(No Model.)

J. H. SHAW.
ELECTRODE DUMB BELL FOR ELECTRICAL EXERCISING APPARATUS.

No. 310,733. Patented Jan. 13, 1885.

Witnesses

Inventor.
James H. Shaw
By David A. Burr
Attorney.

UNITED STATES PATENT OFFICE.

JAMES H. SHAW, OF NEW YORK, N. Y.

ELECTRODE DUMB-BELL FOR ELECTRICAL EXERCISING APPARATUS.

SPECIFICATION forming part of Letters Patent No. 310,733, dated January 13, 1885.

Application filed March 13, 1884. (No model.)

*To all whom it may concern:*

Be it known that I, JAMES H. SHAW, of the city, county, and State of New York, have invented a new and useful Improved Electrode Dumb-Bell for an Electrical Exercising Apparatus; and I do hereby declare that the following is a full and exact description thereof, reference being had to the accompanying drawings, and to the letters of reference marked thereon, making a part of this specification.

My invention relates to the construction of dumb-bells adapted to be used in connection with an electro-magnetic machine or battery, as hereinafter described, the object of my improvement being to provide, in the form of a dumb-bell adapted for muscular exercises, an electrode adapted to close an electrical circuit through the hands, arms, and body of the operator, and fitted to serve as a receptacle for the connecting-cord and other appliances connected with the electro-magnetic apparatus.

Figure 1:
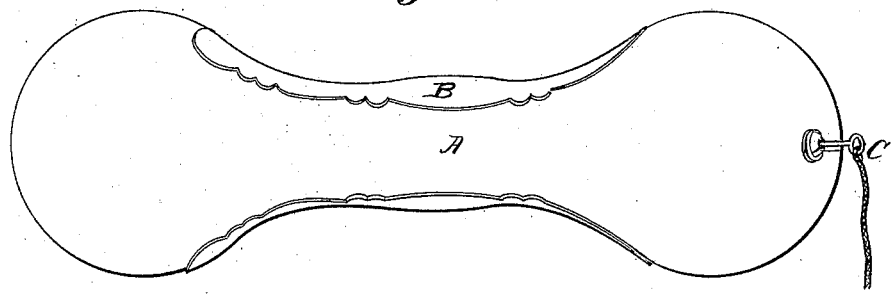
Figure 2:
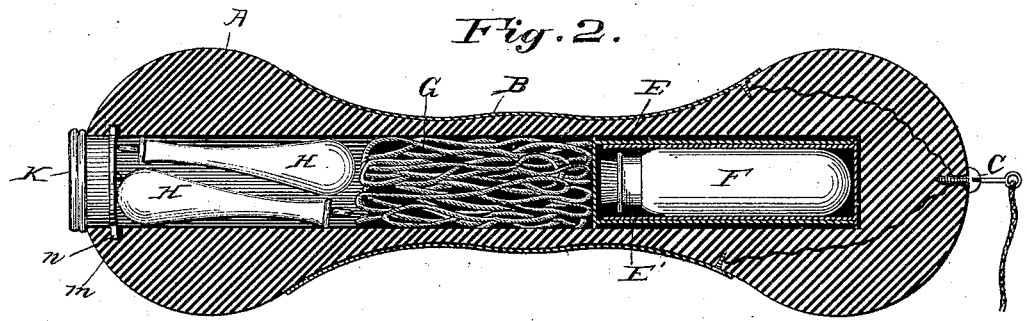

In the accompanying drawings, Figure 1 is an elevation of my improved electrode dumb-bell, and Fig. 2 a longitudinal diametric section thereof.

A represents the body of a wooden dumb-bell; B B, metallic plates fastened exteriorly thereon for manual contact, so that the hand grasping the dumb-bell shall naturally enter fully and closely into contact with the plates; C, a binding screw or post secured in the end of the device, and adapted to receive and hold as required the end of a conducting-wire, to be extended to an electro-magnetic machine or battery. A cylindrical chamber is formed longitudinally within the body A of the dumb-bell, to open out at one end thereof, its open end being closed by a cap or plug, K, provided with pins $m$ in its periphery, made to lock with a bayonet-joint into a recess or groove, $n$, (see Fig. 2,) formed around the inner periphery of the mouth or neck of the chamber. A pair of metallic cylindrical electrodes, E E', inserted one within the other, and inclosing a vial, F, of chemicals for charging the battery, the connecting-cords G G of the electro-magnetic machine, and handles H H for its electrode sponges or plates, together with other minor appliances, may be neatly and safely stored in this receptacle within the body of the dumb-bell without impairing or affecting its value and utility otherwise, so that this form of electrode dumb-bell, in connection and combination with a suitable rheophore dumb-bell containing an electro-magnetic machine, will serve all the purposes of a complete portable electro-magnetic apparatus for exercising and other hygienic purposes.

I claim as my invention—

An electrode constructed, substantially as set forth, in the form of a dumb-bell, with an internal longitudinal chamber therein closed by a suitable stopper, and with an exterior electric conducting-surface adapted for contact with the hand grasping the dumb-bell and for connection with the flexible electric conductor of an electro-magnetic machine or battery.

In testimony whereof I have signed my name to this specification in the presence of two subscribing witnesses.

JAMES H. SHAW.

Witnesses:
A. B. MOORE,
G. H. SPENCER.